United States Patent
Magnitskii et al.

(10) Patent No.: US 7,082,093 B1
(45) Date of Patent: Jul. 25, 2006

(54) OPTICAL DATA STORAGE SYSTEM HAVING COMBINED FLUORESCENT THREE-DIMENSIONAL INFORMATION CARRIER

(75) Inventors: Sergey Magnitskii, Moscow (RU); Dimitriji Pebalk, Moscow (RU); Vladimir Shubin, Moscow (RU); Eugene Levich, New York, NY (US); Andrey Tarasishin, Moscow (RU); Alexej Lezhnev, Moscow (RU); Vladimir Kozenkov, Dolgoprodnij (RU); Mihail Kvasha, Moscow (RU); Galina Dorozhkina, Dolgoprodnij (RU); Nikolay Magnitskii, Moscow (RU)

(73) Assignee: D Data Inc., New York, NY (US)

( * ) Notice: Subject to any disclaimer, the term of this patent is extended or adjusted under 35 U.S.C. 154(b) by 921 days.

(21) Appl. No.: 09/616,965

(22) Filed: Jul. 14, 2000

Related U.S. Application Data (60) Provisional application No. 60/144,019, filed on Jul. 15, 1999.

(51) Int. Cl.
*G11B 3/74* (2006.01)

(52) U.S. Cl. ..................... 369/94; 369/112.22
(58) Field of Classification Search ............ 369/94, 369/112.01, 112.02, 112.16, 112.22, 112.29, 369/284, 288

See application file for complete search history.

(56) References Cited

U.S. PATENT DOCUMENTS 4,927,681 A * 5/1990 Chikuma ............... 428/64.7
5,103,443 A 4/1992 Gerber
6,009,065 A * 12/1999 Glushko et al. ........ 369/112.22

FOREIGN PATENT DOCUMENTS

| | | |
|---|---|---|
| DE | 4444988 | 6/1996 |
| DE | 44 44 988 A1 | 7/1996 |
| EP | 0 354 601 A2 | 3/1989 |
| EP | 0354601 | 2/1990 |
| WO | WO 98/25262 | 6/1998 |
| WO | WO 9833864 | 8/1998 |
| WO | WO 9825262 | 11/1998 |
| WO | WO 9850914 | 11/1998 |
| WO | WO 99/09550 | 2/1999 |
| WO | WO 9909550 | 2/1999 |
| WO | WO 99/23647 | 5/1999 |
| WO | WO 9923647 | 5/1999 |
| WO | WO 9923649 | 5/1999 |

OTHER PUBLICATIONS

Patent Abstracts of Japan, *Record Medium, Recording Method and Recorder Using Same*, pub. No. JP 11149663, Feb. 6, 1999.

* cited by examiner

*Primary Examiner*—Paul W. Huber
(74) *Attorney, Agent, or Firm*—Winston & Strawn LLP (57) ABSTRACT

A general optical storage system (OSS) contains an optical drive and a fluorescent multilayer disc (FMLD), which can be realized as a multilayer structure with data storage in fluorescent spots like pits or spiral grooves, divided by layers, transparent to reading and fluorescent radiation. The OSS includes a fluorescent signal reception device, capable of reading FMLD, as well as reflective CD and DVD discs (including CD-R, CD-RW, DVD-R, etc.). Increase of pit width in FMLD and use of microangle mirrors allow increasing information signal. Elimination of FMLD fluorescence lifetime influence on data pulses duration allows increasing data reading rate. The absorption indices of different layers of FMLD were optimized.

48 Claims, 7 Drawing Sheets

OPTICAL DATA STORAGE SYSTEM HAVING COMBINED FLUORESCENT THREE-DIMENSIONAL INFORMATION CARRIER

REFERENCE TO RELATED APPLICATION

The present application claims the benefit of U.S. Provisional Application No. 60/144,019, filed Jul. 15, 1999, whose disclosure is hereby incorporated by reference in its entirety into the present disclosure.

BACKGROUND OF THE INVENTION

1. Field of the Invention

This invention relates to an optical storage system and more specifically to a storage system comprising a fluorescent disc with many information layers and a drive for reading information from such a disc.

2. State of the Art

Single-layer (as well as two-layer) two-dimensional optical storage systems are widely used in existing devices. Most of the previous technical solutions in such systems of optical data storage were based on registering the change of reflected laser radiation intensity in the local spots (pits) of the data carrying layer. These changes could arise from light interference on the relief optical discs like CD ROM, from reversible polarization effects in magneto-optical or photo-anisotropic media, as well from reversible or non-reversible changes of reflection index in phase change media, or from dyes' clearing up in "dye-reflection layer" systems, etc.

Three-dimensional (i.e., multilayer) optical memory devices provide higher capacity of recorded or stored data than two-dimensional systems. However, they have certain restrictions and additional requirements to construction and features of recording media, ways of recording and reading data, especially in the depth of the registering media.

In the reflection regime, every data-carrying layer of a multilayer optical medium requires a partly reflective covering. The use of such coverings reduces the intensity of both the reading beam and reflected, data carrying beam as a result of direct and reverse passage through the medium towards the necessary data-carrying layer and back to the receiver. Besides, both coherent beams are a subject to difficult-to-estimate diffraction and interferential distortions on the spots (pits and grooves) of the data-carrying layers on their way.

SUMMARY

A general optical storage system (OSS) contains a fluorescent multilayer disc (FMLD) and a reading device. The additional invention is a combined FMLD ROM. Another subject of the invention is a reading device for the data, recorded on a ROM, WORM or RW fluorescent multilayer disc, compatible with reflective CD and DVD-discs. To distinguish a fluorescent signal from a reflected laser signal, the reading device is equipped with a tunable optical element, such as a dichroic mirror, a passive (mechanically distressed) or active (electrooptic) polarizer, tunable to the reflection spectrum and light filter (of Notch type on liquid crystals) passage, etc.

The next subject of invention is the way to increase the information signal, received from multilayer fluorescent optical discs, which results in reduction of errors at reading from the disc. The invention proposes to place a light absorption element, i.e. angle mirror of pyramid type, from the disc side, opposite to the reading side. In this case, a part of fluorescent radiation is reflected from the angle mirror and collected by the aspherical lens of the drive reading system. This method allows to nearly double the fluorescent signal.

Another way to increase information fluorescent signal is to widen the pit in comparison with the CD or DVD standard. One more subject of the invention is the method and device, compensating fluorescence lifetime influence on changing data pulses' duration, what allows increasing maximum reading rate from FMLD.

One more subject of the invention is the FMLD manufacturing method.

Still another subject of the invention is the optimization of absorption index values distribution among different information layers in FMLD.

Another subject of the invention is FMLD manufacturing method and its fluorescent composition receipt.

In this case, multilayer discs with fluorescent reading, where partly reflective coatings are not necessary, are more preferable. Diffraction and interferential distortions will be much less owing to non-coherence of fluorescent radiation, its higher wavelength in comparison to the reading laser radiation, as well as to the transparency and homogeneity (equality of refraction indices of different layers) of the optical media with respect to the incident laser and fluorescent radiation. Therefore, multilayer fluorescent discs have advantages in comparison to reflective ones.

BRIEF DESCRIPTION OF THE DRAWINGS

Preferred embodiments of the present invention will be set forth in detail with reference to the drawings, which show the following.

DETAILED DESCRIPTION OF THE PREFERRED EMBODIMENTS

Preferred embodiments of the present invention will now be set forth in detail with reference to the drawings.

Let us compare theoretical and real fluorescent multilayer discs (FMD) with reflective multilayer discs (RMD) from the point of information signal values. It is assumed that both discs have spiral tracks with pits according to the DVD standard. A focusing objective with fixed numerical aperture focuses information signal (output signal from the disc).

Ideal RMD—a multilayer reflective disc with each layer being an ideal reflector with fixed reflection ratio. All effects but reflection, such as absorption, dispersion, etc., are neglected. The whole reflected signal carries information.

Ideal FMLD—a multilayer fluorescent disc with constant refraction index in the volume. There is no absorption outside the pits, while the pits are filled with fluorescent dye with fixed absorption index and its fluorescence quantum yield is equal to 1. The overlapping of the reading beam with the pit is equal to 1. Fluorescence is emitted isotropically in all direction without absorption inside the disc. Reception efficiency is defined by full material reflection of the disc, that is equal to NA=1. Fluorescence photon energy is equal to reading laser photon one.

The information signal value from layer i of a multilayer disc sufficiently depends upon reflection coefficients (for RMD) and absorption coefficients in pits (for FMLD) distribution in the layers. Thus, coefficient distribution requires optimization. For fixed coefficient distribution between layers, information signal values from layers will also have a certain amplitude distribution. Let's mark minimum of n signals (n is the number of disc layers) as $P_{min}=\min P_i$. Optimization means such coefficient distribution over layers, when $P_{min}$ reaches its maximum.

It is provable that equality of all information signals is the necessary requirement for optimization: $P_i = P_{opt} =$ const.

RMD-System

Let's assume, layer i has reflection index $R_i$. Then, the ideal reflection disc transmittance $T_i = 1 - R_i$. Notice, that the beam passes the above layers (with respect to the reading one) twice. The equation for the reflection coefficient $R_i$ is:

$$R_i = R_{i+1}(1-R_i)^2, \text{ where } R_n=1,$$

from which we get $R_i$ value in a recurrence relation $$R_i = \frac{1+2R_{i+1} - \sqrt{1+4R_{i+1}}}{2R_{i+1}}, \quad (1)$$

$$i = n-1, n-2, \ldots, 1$$

with $P_{opt} = P_o R_1$, where $P_o$—incident radiation power on the disc surface.

See table 1 for the exact dependence of a signal in ideal RMD on the number of layers, calculated according to formula (1):

TABLE 1

Signal value in ideal RMD system.

| | Number of layers | | | | |
|---|---|---|---|---|---|
| 5 | 10 | 20 | 30 | 50 | 100 |
| $P_{opt}/P_o$, $10^{-2}$ | | | | | |
| 12.3 | 5.6 | 2.7 | 1.8 | 1.0 | 0.51 |

In real CD/DVD technology, the reflective coverage is obtained by metal film deposition. It is known that in the visible spectrum range, i.e., in the studied wavelength range around 600 nm, metal films have both high reflection and high absorption coefficients. It is at least valid for such widely used materials as Al, Ag, Au at $\lambda \sim 600$ nm [see the reference book *Physical values* by I. S. Grigoryev, E. Z. Meylikhova, Energoatomizdat, 1991 for parameters]:

| | Material | | |
|---|---|---|---|
| | Al | Ag | Au |
| R | 0.9 | 0.95 | 0.7 |
| A = 1 − R | 0.1 | 0.05 | 0.3 |

Thus, in real a RMD system every layer will possess both fixed reflection coefficients and finite absorption. To provide high transmittance in a multilayer RMD system, we should deposit very thin films, as the skin-layer in metals at $\lambda \sim 600$ nm is about 500 Å. However, with a decrease of the film thickness the absorption coefficient increases with its maximum in the range of 100 Å, where the absorption coefficient is equal to tens percents for most metals. Thus, to provide high transmission in RMD system we should use films up to several tens of angstroms thick, but even in this case absorption coefficient remains too high. For example, gold film with about 50 Å thickness has reflection coefficient 0.172 and transmission 0.542, thus its absorption coefficient is 0.286 at $\lambda = 650$ nm [For the structure of evaporated metal films and their optical properties, see JOSA, vol. 40, No. 4, pp. 203–211, 1950]. According to evaluations of an ideal system, for multilayer reflection disc optimization, the layers' reflection coefficient is equal to 1–5%. Silver film answers these requirements. Thin silver film up to 100 Å thick has a reflection coefficient nearly equal to its absorption coefficient. Therefore, there arises monotonic dependence between reflection and absorption coefficients. We use the following equation to calculate reflection coefficient $R_i$:

$$R_i = R_{i+1}(1-2R_i)^2, \text{ where } R_n=1.$$

Then we get $R_i$ value as a recurrence formula:

$$R_i = \frac{1+4R_{i+1} - \sqrt{1+8R_{i+1}}}{8R_{i+1}}, \quad (2)$$

$$i = n-1, n-2, \ldots, 1$$

with $P_{opt} = P_o R_1$, where $P_o$—incident radiation power on the disc.

See table 2 for the exact dependence of a signal in such RMD on the number of layers, calculated according to the eq. (2):

TABLE 2

Signal value in RMD with thin silver films.

| | Number of layers | | | | |
|---|---|---|---|---|---|
| 5 | 10 | 20 | 30 | 50 | 100 |
| $P_{opt}/P_o$, $10^{-2}$ | | | | | |
| 6.74 | 2.94 | 1.36 | 0.89 | 0.52 | 0.26 |

FMLD System

Let's assume an absorption coefficient in a pit of layer i in an ideal FMLD equal to $a_i$. Fluorescent signal power $p_i^{fl}$ from the pit in layer i, falling on the lens aperture, can be described as:

$$P_i^{fl} = P_0 \varphi_{fl} k \xi a_i \prod_{j=1}^{i-1} (1 - A_j),$$

where $\phi_{fl}$—fluorescence quantum yield, k—coefficient of light-beam overlapping with pit;

$$\xi = \frac{1 - \sqrt{1 - (NA/n_r)^2}}{2}$$

lens collection coefficient, where NA—numerical aperture, $n_r$—polymer refraction index, $A_i$—total absorption in the i-layer.

For a fluorescent disc, $A_i = (S_{pit}/S_0)a_i$, where $S_{pit}/S_0$—ratio of the square, filled by pits to the total disc surface square.

Information signal power is given by:

$$P_{opt} = \gamma P_o A_1 = \gamma P_o \frac{1}{S_0/S_{pit} + (n-1)}, \quad (3)$$

$$\gamma = \varphi_{fl} k \xi (S_0/S_{pit}).$$

For an ideal disc of the DVD standard, $$\xi = \frac{1 - \sqrt{1 - (1/n_r)^2}}{2}$$

As it was fixed before, the collection coefficient in ideal disc is defined by the total internal reflection angle, which depends on reflection index of disc $n_r$. Hence, the use of emersion optics allows collection efficiency increase up to 100%. Therefore, let's assume collection coefficient in ideal FMLD system be equal to 100%.

See table 3 for the exact dependence of a signal in ideal FMLD system on the number of layers, calculated according to eq. (2):

TABLE 3

Signal value in ideal FMLD system.

| | Number of layers | | | | | |
|---|---|---|---|---|---|---|
| | 5 | 10 | 20 | 30 | 50 | 100 |
| $P_{opt}/P_o$, $10^{-2}$ | 50 | 31 | 17.4 | 12.1 | 7.6 | 3.9 |

In a real FMLD, the main factors decreasing the information signal power are limited collection coefficient, decreased fluorescence quantum yield, and restricted overlapping of laser beam with pit. Reflection from layers can be neglected, as reflection coefficients of different layers can be chosen equal with accuracy up to 10%, which brings Frenel reflection on every edge below 0.1%.

First, let's consider the DVD-like optical scheme with NA=0.65 and polycarbonate disc. Dye fluorescence quantum yield in a polymer matrix can exceed 0.95, so further we consider it equal to 1. Then at collection coefficient 4.4% and beam overlapping with pit 0.8 we receive the following signal values in multilayer system:

TABLE 4

Signal value in FMLD system with DVD-like optical scheme.

| | Number of layers | | | | | |
|---|---|---|---|---|---|---|
| | 5 | 10 | 20 | 30 | 50 | 100 |
| $P_{opt}/P_o$, $10^{-2}$ | 1.7 | 1.1 | 0.61 | 0.43 | 0.27 | 0.14 |

At the same time, as stated above, maximum collection in FMLD system depends on total internal reflection angle. From the other side, according to our investigations, the minimum polymer refraction index is equal to 1.4. Thus, increasing the lens numerical aperture up to 1 (limit for non-emersion objective) allows increasing collection coefficient up to 0.15. At that conditions coefficient of beam overlapping with a pit is close to 1, providing the following signal values in multilayer system:

TABLE 5

Maximum signal value in FMLD system with non-emersional objective.

| | Number of layers | | | | | |
|---|---|---|---|---|---|---|
| | 5 | 10 | 20 | 30 | 50 | 100 |
| $P_{opt}/P_o$, $10^{-2}$ | 7.5 | 4.7 | 2.6 | 1.8 | 1.13 | 0.582 |

Thus, the analysis of both systems showed advantages of fluorescent system in signal values in comparison to reflective system. Potentially, the signal value in the FMLD system is 4 times higher than in the ideal reflective system.

Figure 1:
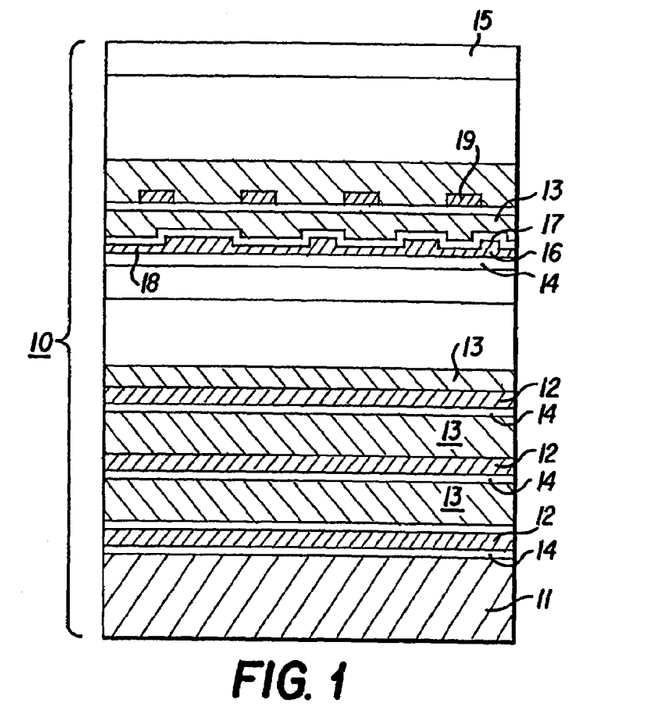
FIG. 1. Disc cross section showing a structure of a multiple layer fluorescent optical disc as a first embodiment of the present invention.

FIG. 1 shows schematically a fluorescent optical disc according to a preferred embodiment. Fluorescent optical disc 10 includes a transparent protective substrate 11 and successive data-carrying layers 12, located one above another, separated by polymer layers 13 and assembled in single block by gluing layers 14. Lacquer coverage 15 protects fluorescent disc 10 from mechanical damage and aggressive media. Substrate 11 is a flat glass, polycarbonate, polymethylmetacrylate or other polymer plane, transparent to visible light. Substrate 11 can be 0.6 or 1.2 mm thick with the diameter of 120 mm. Protective layer 15 is obtained by deposition and drying of resin solution or by polymer film lamination with adhesive. Intermediate layers are 10–300 µm thick.

Protective layer 15, intermediate-13, adhesive-14 and information-12 have refractive index at reading and fluorescence wavelengths close to one of substrate 11. It is necessary to remove light reflection on the layer boundaries. There are several ways to obtain separating layers:

Polymer solution pouring on the optical disc with following solvent evaporation.

Lamination of an isotropic polymer film with an adhesive on the optical disk.

Figure 4A:
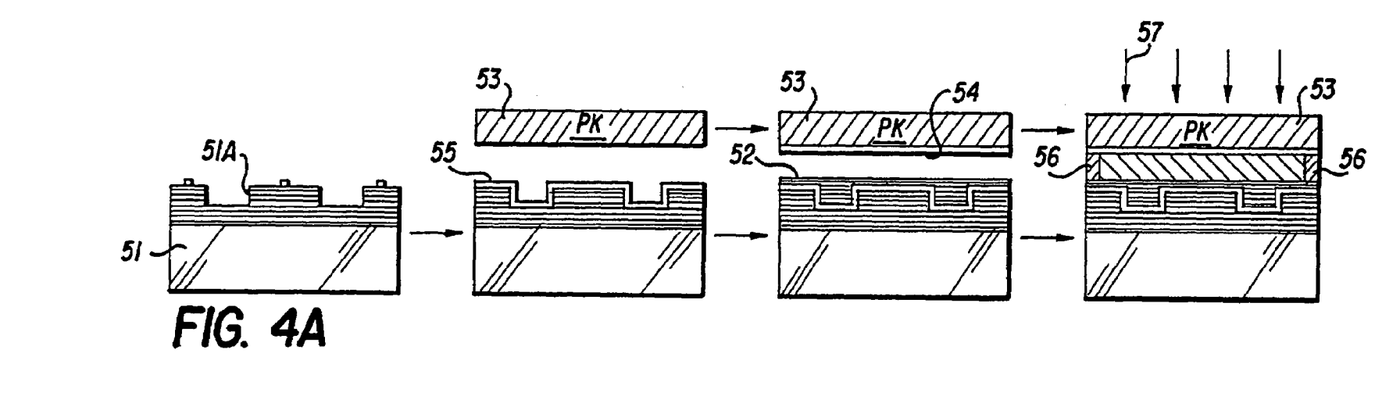
FIG. 4A. Steps of forming a recording layer of a fluorescent optical disc.
Figure 4B:
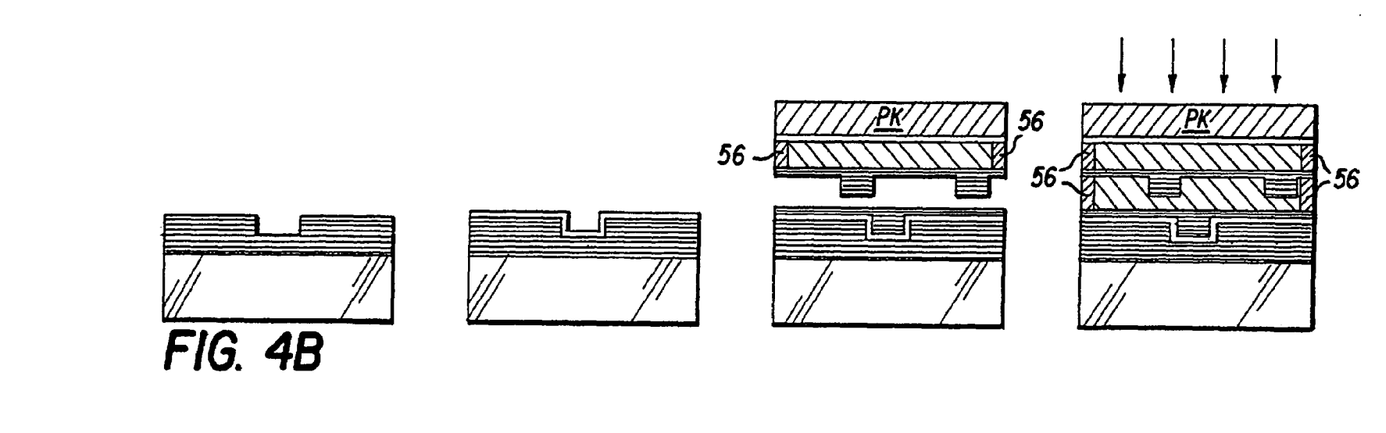
FIG. 4B. Steps of forming subsequent recording layers of a fluorescent optical disc.

The use of UV-cured liquid or "dry film" photopolymerizing compositions is the most interesting variant for obtaining separating layers. See FIGS. 4A and 4B, illustrating the technological process of obtaining thin separating layers, which will be described below in greater detail Every data-carrying surface 12 is located on the separating layer 13 surface within FMLD bulk 10.

In general, an FMLD can contain only ROM layers or can also contain WORM and RW layers.

Another alternative is the possibility to include in FMLD also spatially-separated reflective ROM, WORM or RW layers of non-fluorescent nature (magneto-optical or phase-change). The refraction index of these data layers differs from separating layer refraction index.

It is preferable to locate transparent fluorescent layers closer to the reading radiation source, with reflective layers behind them.

As one can see from FIG. 1, spatially-separating information layers can be fully fluorescent (layer 16), if the fluorescent substance fills not only pits (ROM) or grooves (WORM) 17, but also the space 18 above them. In this case, absorption and fluorescence in pits or grooves will have higher absolute intensity.

In another variant data layers have islands-like structure—only pits and grooves 19 are filled with fluorescent substance, providing higher contrast at reading.

Figure 2A:
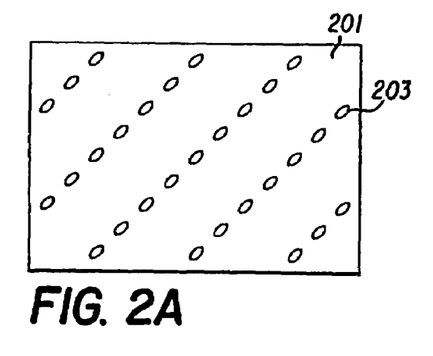
FIGS. 2A–2C. Configuration of pits in ROM and information signals, recorded in fluorescent WORM grooves.
Figure 2B:
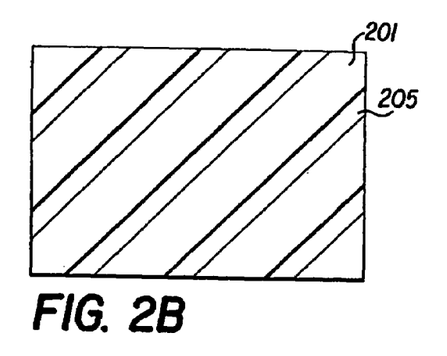
Figure 2C:
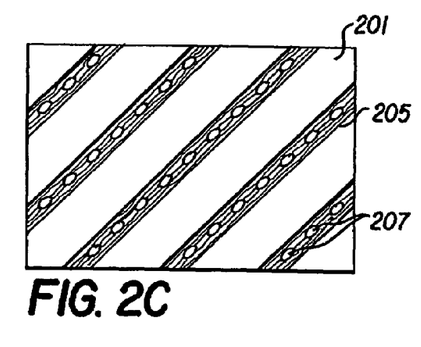

See FIGS. 2A–2C for CCD-microimages of a substrate 201 having fluorescent pits 203 (ROM, FIG. 2A), grooves 205 (WORM, FIG. 2B) and recorded images 207 in the grooves 205 (WORM, FIG. 2C).

We propose to widen the pit in comparison to the CD/DVD standard. In a CD or DVD, pit width is limited not by cross-talk from adjacent tracks, but by the fact that with interferential subtraction of radiation reflected from a pit from radiation of all spots, at a certain pit width the complete suppression of reflected signal becomes possible. Increasing the width further, we get the reflected signal increase and the information signal decrease. For fluorescent discs, pit width is limited by cross-talk from adjacent tracks. The model calculations showed 30% signal increase at pit width 0.6 μm, while signal/noise ratio remained tolerable and equal to 70. From the above reasoning, we propose increasing the pit width up to 0.6 μm.

As stated above, the information signal value from FMLD layer i sufficiently depends on absorption coefficients' distribution in pits and grooves of FMLD different layers. Thus, coefficients' distribution requires optimization. At the given distribution of absorption coefficients between the layers fluorescent information signals from pits will have the same distribution of intensity.

At that, a necessary optimization requirement is the equality of intensity of all information signals, irrespective of their location within the disc.

Figure 3:
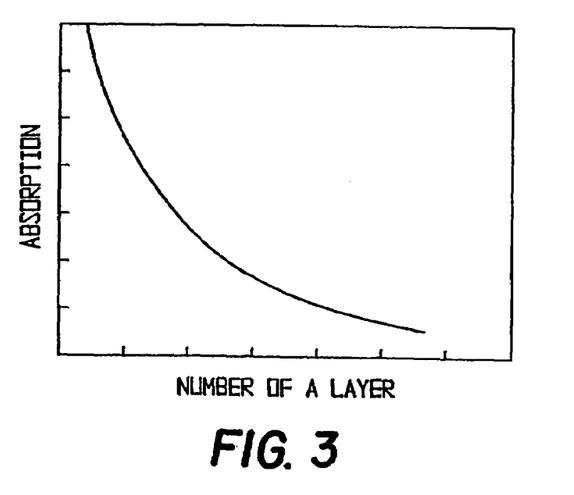
FIG. 3. Distribution of absorption coefficients in layers of a 10-layer fluorescent disc and of reflection coefficients in a 10-layer reflective disc.

See FIG. 3 for absorption coefficients' distribution in layers, calculated for ideal fluorescent disc.

See FIG. 4A for a schematic description of technological steps of FMLD data-carrying layers forming as one of the examples for the present invention.

The proposed method is based on successive layer-by-layer forming of data-carrying layers with microrelief of pits or grooves, filling ROM, WORM or RW microrelief with fluorescent material and their assembly as a multilayer structure.

Various methods used for mass replication of relief optical elements like CD-ROM, relief holograms and diffraction gratings, etc. can be used to form layers with microreliefs.

Use of liquid photopolymerized composition (PhPC) or dry photopolymerized films, applied in microelectronics, is the most preferable as a relief-base material.

According to the proposed process, the layer PhPC 52 is deposited on a glass or metal disc stamper 51 with cavities (pits or grooves) 51A and covered with a polycarbonate, glass or another substrate 53. To improve adhesion, the substrate can be covered by adhesive layer 54. Anti-adhesive 55 (typically 100 angstroms thick) is used to diminish PhPC adhesion to stamper 51. Layers 54, 55 are optional.

Use of liquid PhPC allows utilization of spacers 56 with calibrated thickness (say, 10–30 microns). In case of dry film PhPC spacers are not needed.

After PhPC is deposited and covered with substrate 53 the obtained sandwich is exposed to UV-radiation 57 until its full hardening.

The sandwich is dismantled and the obtained replica is covered with fluorescent composition.

Then the operations are repeated N times to obtain an N-layer disc, as shown in FIG. 4B.

In this case PhPC combines the functions of relief base, separating and gluing substances.

An important problem during FMLD production is optimization of pits' and grooves' filling technology in every data-carrying layer. Such optimization increases contrast (the ratio of signals from fluorescence centers in pits to background signal from the layer surface outside pits). This is described in U.S. Pat. No. 6,071,671. Here the way of better volume filling of the data-carrying layer surface cavities with fluorescent composition is proposed, which results in a bigger fluorescent intensity difference between useful signal from fluorescence centers in surface cavities and background signal from the layer surface outside cavities.

The following method for multilayer fluorescent discs' production with fixed fluorescence centers (pits or grooves) is proposed:

A. Relief surface preparation

Surface of optically transparent data-carrying layer is physically or chemically treated in order to:

A1. change its surface's energetic properties,

A2. change its hydrophilic-hydrophobic properties and improve its surface wetting by deposition of liquid polimerized composition, A3. improve polymerization products' adhesion to the surface and A4. diminish surface electric charge density or change the charge polarity, which influences surface sorption and aggregation of luminofors with polar or ionic (cation or anion) functional groups.

Possible methods of changing the surface physical and chemical characteristics and its chemical nature modification are: alkaline or acid hydrolysis, chemical or photo-chemical oxidation in active gas agents (i.e., oxygen) of functional surface groups which if needed could be modified chemically, halogenization, sulfating or amination of surface macromolecules. The surface can be also processed by surface-active substances, deposition of antistatic substances on the surface (i.e., by aerosol spraying), adhesion promoters, coverings by films of other chemical nature, plasma-chemical processing and also processing in crown charge.

B. Optically transparent layer, prepared as described in A, with pits (cavities of certain form) on the surface, is covered with liquid polymerizating composition, containing:

B1. one or more liquid low-volatile components (monomers, oligomers) polimerizing under heat or electromagnetic-radiation (light or radiation-chemical effect);

B2. solvent, if necessary, consisting of one or more components, which is more volatile than the liquid polymerizing components and does not dissolve substrate material. The solvent can contain components with reactive functional groups, capable to be polymerized together with the polymerizing components described in B1;

B3. polymerization catalyst, if necessary;

B4. luminophore, consisting of one or more components, capable to be dissolved in the solvent and polymerizing components. The luminophore can contain components with reactive functional groups, capable to be polymerized together with the polymerizing components as described in B1;

B5. additives, improving homogenous luminophore distribution in liquid polymerizing components, and adhesion promoters as well.

In the case of low-viscous polymerizing components, use of solvent described in B2 is not obligatory as one of the polymerizing components from B1 can solve other components.

C. The surface cavities of information layer are filled in such a manner that allows maximize difference between composition volume in the cavities (see B) and on the surface outside them. For example, C1. the liquid composition described in B is deposited on substrate (disc) surface. Then the disc is rotated at certain rate for certain time. As a result, high-violating components of the solvent are removed from the composition with gradual accumulation of liquid low-violating polymerizing components with dissolved luminophore in surface cavities. Centrifugal force and solvent evaporation serve to withdraw excess liquid components from substrate surface.

This sequence of operations can be repeated the necessary number of times to provide maximum filling of cavities. Mixing of the deposited composition with the liquid polymerizing components, filling pits, in process of deposition is hindered by their strong difference in viscosity C2. There is another method of filling the continuous cavities or channel (i.e., spiral). In this case we apply auxiliary plane transparent substrate to the substrate surface with cavities, fixing it i.e., mechanically or by pasting edges together and providing their maximum contact (i.e., by vacuum). Therefore, we get a substrate with empty continuous channel with fixed volume. Then the channel is filled through a hole on the edge of pasted substrates or a hole from the plane substrate the composition described in B, whose viscosity is decreased by adding the solvent with reactive polymerizing groups. As a result of capillary effect, the channel is filled with polymerizing composition. Pressure overfall between the channel ends can improve the filling. Then, if necessary, the two substrates can be disassembled.

D. After all operations described in C are fulfilled, the liquid components should be polymerized by photochemical or thermal impact. This process is proceeded so that to avoid luminophore destruction or change of its luminescence spectrum during polymerization hardening. For thermal polymerization it means, that one shall apply certain temperature regieme and use appropriate initiators. If photochemical polymerization is used one should choose certain photoinitiator and radiation with appropriate spectrum. For example, light filters can be used to selectivity radiation impact only on the photoinitiator.

The described above method provides forming of luminescence centers, fixed in cavities on the substrate surface.

E. To increase difference in luminescence intensity of polymerized composition in cavities and the remaining polymer film on substrate surface outside cavities it is necessary to reduce luminophore concentration or its luminescence in the surface layer. For example, plasmochemical surface etching can reduce the surface film layer. Radical polymerization (i.e., for acrylates) can be realized by photoradiation of liquid polymerizing composition from the substrate side, at that air oxygen serves as inhibitor, e.g. prevents its surface layers' polymerization. Thus they remain liquid and can be withdrawn from the substrate surface (i.e., by surface processing in suitable solvent). The other possible method is a selective dosated in time surface exposing to UV-radiation, which causes change of luminophore chemical nature (i.e., photodestruction) in the sub-surface layer. The other possible method is an impact of dosated exposure to radiation of certain spectrum (i.e., UV-light) on the additional substance in the composition, which forms under light a fluorescence quencher. Fluorescence quencher can also be brought in to the sub-surface layer by dosated diffusion from its liquid (solution) or gas (vapor) phases during their contact with information layer surface.

The present invention offers also the following method of multilayer optical disc manufacture with fixed luminescence centers. The initial composition, containing solvent, polymerization components, cure catalyst and auxiliary substances described in B1, B2, B3, B5, does not contain luminophore described in B4. The cavities on substrate surface are filled with liquid polymerizing substance, as described above. Thermal or photo curing is used for polymerizing components. Photocuring in this case does not require light filter, that speeds the process up. Then the surface is etched (i.e., plasma-chemically) to withdraw the remaining polymerized film outside the cavities. So, the surface has different physical and chemical properties in the region of cavities and outside them, such as: density, porosity, wetting and absorption ability, etc. Then the obtained substrate is brought into contact with liquid (solution) or gas (vapor) phase, containing luminophore. The luminophore diffuses into polymerized composite in the surface cavities with selectively absorbing of luminophore. Then the process of thermal or photo processing is followed for drying and fixing luminophore.

After the above operations the obtained information layers are glued to each other by one of the methods, i.e. shown in FIGS. 4A and 4B, using materials with certain optical characteristics (i.e., optically transparent in the spectrum range above 300 nm with refraction index equal to that of the substrate). Thus, we obtain a multilayer disc with fixed luminescence centers.

The information layers either are glued by autoclave pressing, using connecting polymer films (i.e., polyvinylbutyrate, siliconorganic, urethane), located between them or by pouring monomers or oligomers between the layers with their future polymerization. The polymerizing components can be the same as in the luminophore composition (B).

Figure 5:
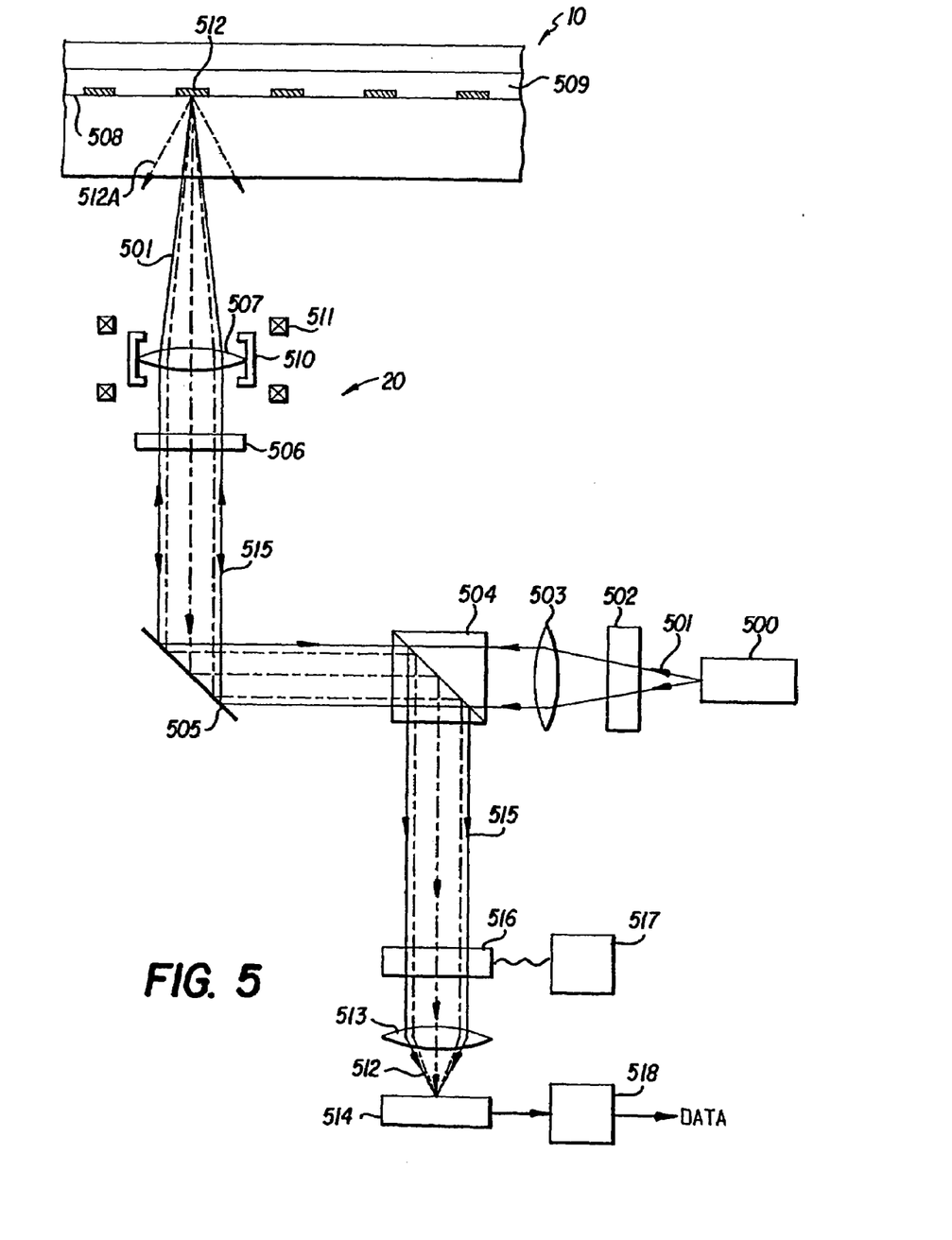
FIG. 5. A simplifed flowchart of optical data storage system as the first embodiment of the present invention.

See FIG. 5 for the simplified scheme of an optical data storage system using the fluorescent optical disc 10.

This optical system is constructed as a ROM or WORM and RW type optical disc retrieving apparatus, in which the circularly polarized beam falls on the fluorescent optical disc 10 and the recorded information is detected as the fluorescence radiation intensity variations.

Optical head 20 includes a laser diode 500 producing a primary linearly polarized light beam 501 at approximately 650 or 780 nm. Grating 502 diffracts beam 501 to produce two secondary beams for tracing, in addition to the primary beam first.

The resulting three-component beam is transmitted through the lens 503, beam splitter 504 and is reflected by mirror 505 and then passes the quarter-wavelength plate 506. The plate 506 makes the beam circularly polarized. Then the light beam passes through a focus of the lens 507 and is focused onto one of the data surfaces (surface 508 of substrate 509) of fluorescent optical disc 10. Lens 507 is mounted in holder 510, which is adjusted to optical disc position by the focus actuator motor 511.

In case there is a informative pit 512 in this microregion, laser beam 501 is partly absorbed and reemitted as fluorescent radiation 512A. This radiation is focused on multi-sector detector 514 with the help of the lens 507, mirror 505 and beam splitter 504. Part of the laser beam 501 can be reflected from data surfaces 508 and utilized as reflection beam 515.

When the reflected beam 515 passes through the λ/4 plate 506, it becomes linearly polarized, while its polarization plane turns on 90 degrees. Thus, the reflected beam 515 is splitted by beam splitter 504 and directed on the detector 514.

Figure 6:
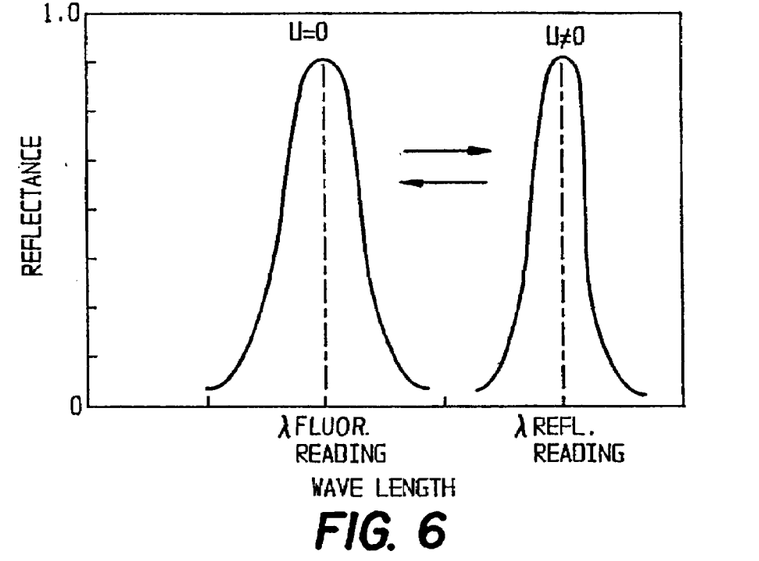
FIG. 6. A plot reflectance for the Notch filter as a spectral filter.

The above system can diminish signal-noise ratio at fluorescent reading. However, in contrast to the reading laser radiation, fluorescent radiation is not polarized and has another wavelength. Therefore, they can be separated by spectrum or polarization filters 516, such as passive, i.e., interferencial or dichroic filters, polarizers of Glan-Tompson type or film-laminated polaroids. It is possible to use the in-built electrically controlled spectrum filters of Notch type on the base of holesteric liquid crystals or of Pockels cells' type. See FIG. 6 for the reflection spectrum of such filter at two values of controlling voltage from unit 517. One can see that such filters provide quality filtration upon the spectrum. Thus, such device provides data retrieving both from fluorescent ROM, WORM or RW optical discs and usual CD or DVD ROM, WORM and RW systems of magneto-optical and phase-change types.

One of the problems at reading from fluorescent multi-layer discs is to compensate the influence of fluorescent dye lifetime on data pulses duration. It is also possible to increase maximum reading rate.

Figure 7:
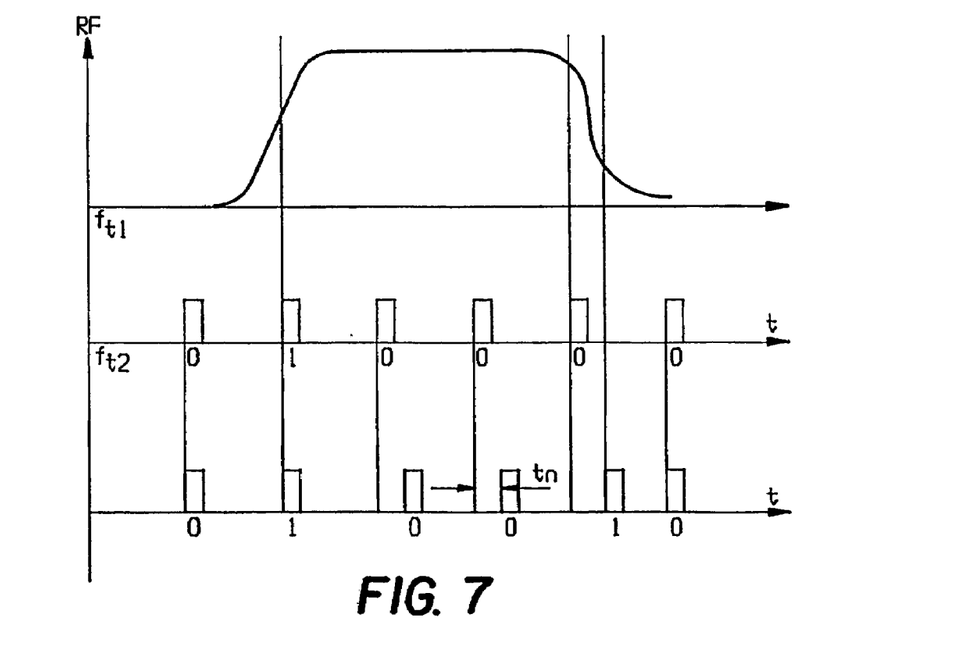
FIG. 7. Voltage epurs.
Figure 8:
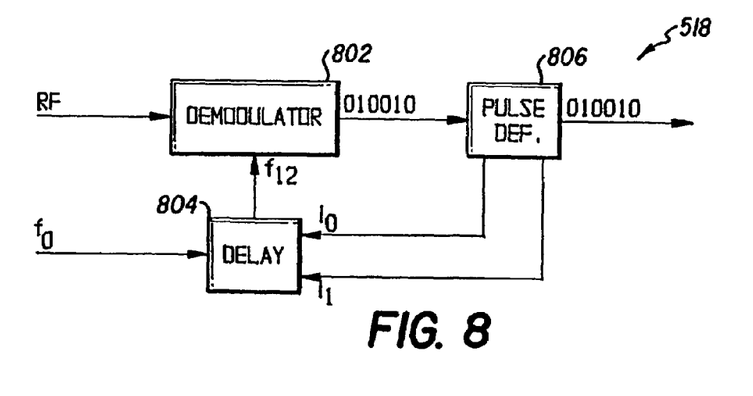
FIG. 8. The flowchart of compensation system according to the present invention.

It is known, that the pulse front is defined at the moment of clock pulses switching (FIG. 7). Because of jitter, this moment can coincide not with the edge, but with the pulse peak or bottom. Then a wrong decision is possible. We propose the following method of compensation. After the leading edge is registered, the device 518, shown in FIG. 5 and described schematically below with reference to FIG. 8, provides time shift of all clock pulses on time, approximately equal to fluorescence lifetime. In this case, the clock pulse will coincide with the trailing edge, thus compensating the delay influence. After the trailing edge is registered, time shift of the clock pulses is cancelled. At fluorescence lifetime of 2–3 ns disc rotation rate of 10 is possible. The proposed method can compensate the front delaying up to 0.2–0.3 ns, thus, making it possible to reach the rates up to ×100 without limitations.

See FIG. 8 for the flowchart of the compensating device 518, additionally placed on the multi-segment optical detector output (FIG. 5). It includes a demodulator, which receives RF signal and signal at $f_{r2}$, which demodulates the signal at coming of signal at $f_{r2}$. The last is formed in a controlled delay circuit 804 which delays pulses at $f_{r1}$ on the time $\tau_{fl}$ after it receives signal $1_1$ (that is $f_{r2}=f_{r1}+1/\tau_{fl}$) on its controlling input. After it receives pulse 10, the delay circuit becomes disconnected and the unit just emits pulses at $f_{r2}=f_{r1}$. The pulse edge sign definition scheme 806 generates pulse $1_1$ when passing the RF signal leading edge or pulse $1_0$ when passing its trailing edge.

See FIGS. 9A–9D for another schematic flowchart of optical storage system with a mechanically pushed-in interference filter 903, as described in the present invention. In this scheme radiation 501 from semiconductor laser 500 (λ=650 or 780 nm) via semi-transparent mirror 901, mirror 902 and aspherical lens 509 is focused on the information layer of the optical disc 10. The reflected 905 or fluorescent signal 906 (depending on the disc type) via semi-transparent mirror 901 is received by multi-segment photodetector 514. Depending on the type of the disc 10, the interference filter 903, which transmits radiation with fluorescence wavelength $\lambda_{fl}$ and does not transmit with the laser wavelength, is pushed in front of the multi-segment photodetector. The disc type can also be recognized automatically. For this purpose in a starting position the filter should be in front of the photodetector and, if after start of reading there is a signal on the output of the photodetector, it is an FMLD disk, if there is no signal, that is either CD or DVD disc. In the latter case a filter is pushed forward and the photodetector receives the signal on the laser wavelength, reflected from the disk.

Figure 9A:
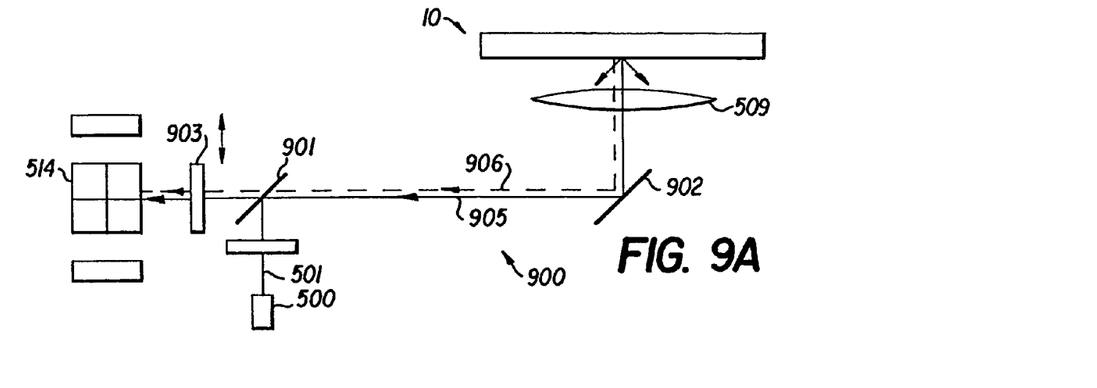
FIGS. 9A–9D. Schematic flowchart of optical data storage system of the present invention.
Figure 9B:
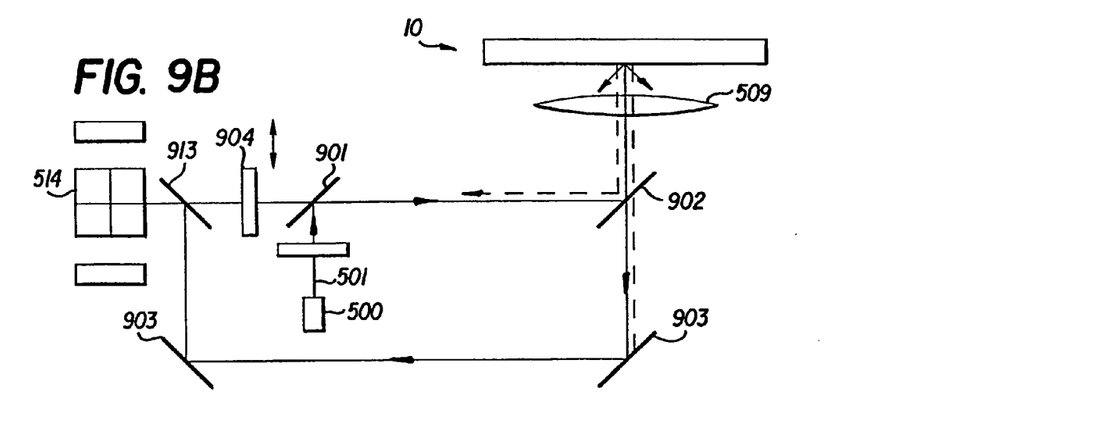

See FIG. 9B for the FMLD drive scheme with dichroic mirrors 902. In contrast to the above-described drive, here the reflected 905 or fluorescent 906 signal from the optical disc is received by dichroic mirror 902, which reflects radiation at laser wavelength and transmits the radiation at fluorescence wavelength $\lambda_{fl}$. Then the fluorescent signal passes through a system of dichroic mirrors, which serve also as spectrum filters, and is received by a multi-segment photodetector 514. Depending on the disc type, the shutter 904, stopping the reflected radiation at laser wavelength, is either pushed back or forward. The disc type can also be recognized automatically following the above procedure.

Figure 9C:
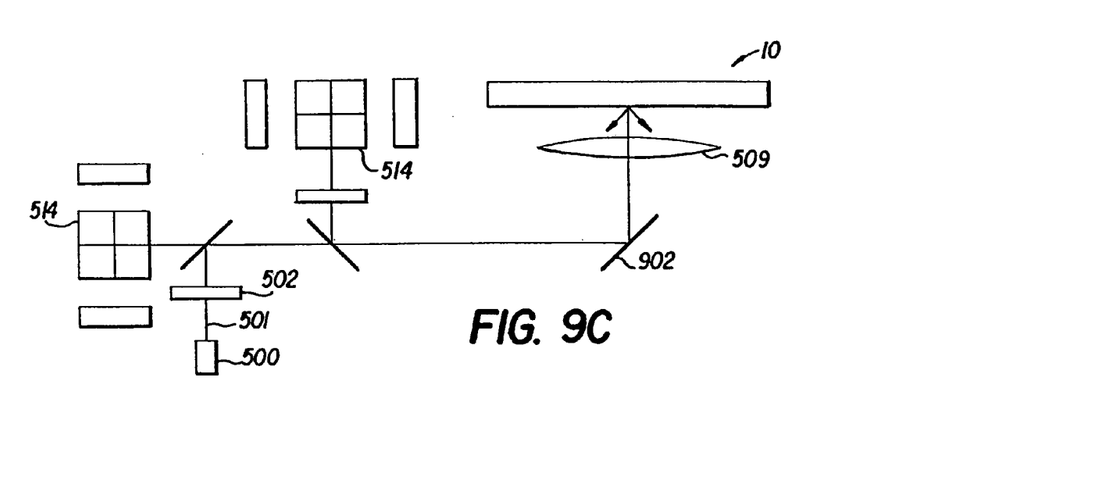

See FIG. 9C for FMLD drive scheme, which is located on the same plane with two photodetectors. Unlike the two previous schemes, it has no moving elements, but has additional photodetector. In a similar manner as in the above described scheme, the reflected or fluorescent signal from the optical disc is received by dichroic mirror 902, which reflects radiation at the fluorescence wavelength $\lambda_{fl}$ and transmits radiation at the laser wavelength. Then the fluorescent signal at $\lambda_{fl}$ passes through the filter to the first multi-segment photodetector, and radiation at the laser wavelength is received by the second multi-segment photodetector. In this case, the disc type can be recognized automatically by the signal presence on the appropriate photodetector output.

Figure 9D:
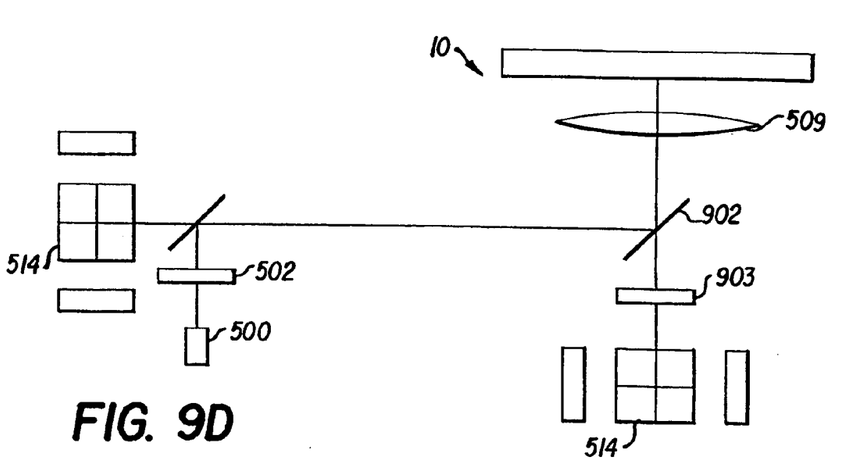

The difference between schemes on FIGS. 9C and 9D is that the latter requires one mirror less, hence the reading device is located both in parallel and in perpendicular planes to that of the disc.

Thus, the devices shown in FIGS. 5 and 9A–9D can provide reading and recording both on FMLD, CD and DVD, that broads their application range.

Figure 10A:
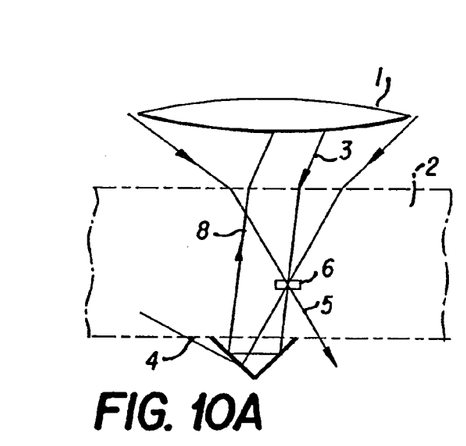
FIGS. 10A–10C. Schematic examples of multilayer fluorescent optical disc structure with angle mirrors.
Figure 10B:
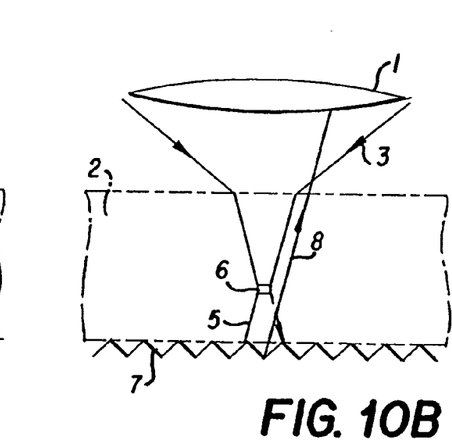
Figure 10C:
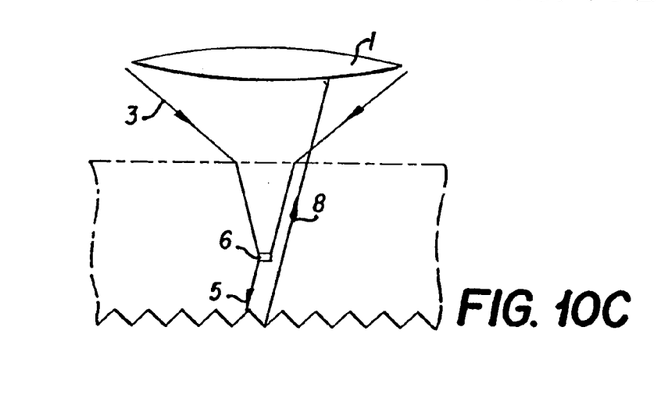

To increase the received fluorescent signal we propose placing a light-collecting element from the back side of the disc, for example, an angle reflector as a mirror or pyramid (see FIGS. 10A–C).

In this case the fluorescent radiation 5, passes through the back side of the optical disc 2, is reflected by the angle reflector 4 and then is collected 8 by the aspherical lens 1 of the drive's reading system. This method allows nearly to double the fluorescent signal.

The angle reflector can be realized as a separate element 4 (FIG. 10A), which follows the position of the reading spot 3,6 with the help of a special device and combines optical axises of the reading system with those of the angle reflector. The second way to realize this method is to form micro-angle reflectors 7 on the disc surface (see FIG. 10B). At reading this disc is located under the FMLD.

The third variant of the method's realization is to form micro-angle reflectors 9 on the FMLD back side (see FIG.

10C). In this case it is possible to avoid radiation losses, caused by reflection on the disc-air and air-disc boundaries, which take place in the previous two variants. The micro-angle reflectors can be formed in a similar way to pit forming technology on CD, with following metal deposition for increasing reflectivity.

To obtain maximum signal on the photodetector, located in the focal plane of the drive's aspheric lens, acting also as a spatial selector, the geometric sizes of angle reflector d shall be much less than the spot, radiation from which is collected by the lens:

$$d<<h^*\sqrt{(1/1-(NA\backslash n)^2)},$$

where h—distance between the pit and the angle reflector;
NA—the lens' numerical aperture;
n—disc refraction index.

While various preferred embodiments of the present invention have been set forth above, those skilled in the art who have reviewed the present disclosure will readily appreciate that other embodiments can be realized within the scope of the present invention. For example, the thicknesses and numbers of layers are illustrative rather than limiting. Therefore, the present invention should be construed as limited only by the appended claims.

We claim:

1. Optical data storage and reading device comprising: a multilayer fluorescent information-carrying optical disc; a source of reading radiation; means for focusing the reading radiation into a micro-spot of the multilayer disc; means for spatially separating the reading radiation from information-carrying radiation; and means for detecting an availability of bit information in the micro-spot, wherein a plurality of micro-spots are provided in the disc for increased transmission of data-carrying radiation, wherein the detecting means comprises one or more detectors, the source of reading radiation comprises a laser diode producing a primary linearly polarized light beam, the focusing means comprises a grating that diffracts the beam, a lens, beam splitter and mirror for transmitting the information carrying radiation to the detectors; and the separating means comprises a spectrum filter or polarizer.

2. Device according to claim 1, wherein the means for spatially separating comprises a spectrum filter.

3. Device according to claim 2, wherein the spectrum filter comprises a dichroic filter.

4. Device according to claim 2, wherein the spectrum filter comprises a smectic liquid crystal.

5. Device according to claim 2, wherein the spectrum filter comprises a Notch filter.

6. Device according to claim 5, wherein the Notch filter is a liquid crystal Notch filter.

7. Device according to claim 5, wherein the Notch filter is a Notch filter tuned over a spectrum.

8. Device according to claim 1, wherein the means for spatially separating comprises a polarization removable film polarizer.

9. Device according to claim 1, wherein the means for spatially separating comprises an electrically controlled polarization filter of a Pockels cell type.

10. Device according to claim 1, wherein the means for spatially separating is located in front of the detector.

11. Device according to claim 1, wherein the grating diffracts the beam to produce two secondary beams in addition to the primary beam.

12. Device according to claim 1, wherein the multilayer fluorescent disc includes a transparent protective substrate and successive data-carrying layers, located one above another, separated by polymer layers and assembled in single block, with the data-carrying layers including pits or grooves, or both, filled with fluorescent material.

13. Device according to claim 12, wherein the data-carrying layers include micro-spots comprising pits, grooves, or both, each having widths of about 0.6 µm for increased transmission of data-carrying radiation.

14. Device according to claim 1, wherein the pits or grooves each have widths of about 0.6 µm for increased transmission of data-carrying radiation.

15. Optical data storage and reading device comprising: a multilayer fluorescent information-carrying optical disc; a source of reading radiation; means for focusing the reading radiation into a micro-spot of the multilayer disc to generate information carrying information that is transmitted in various directions; means for spatially separating the reading radiation from information-carrying radiation; means for detecting an availability of bit information in the micro-spot; and a light-controlling element for reflecting towards the detecting means at least part of the information-carrying radiation that is moving away from the detecting means, thus increasing an amount of the information-carrying radiation which reaches the detector.

16. Device according to claim 15, wherein the light-controlling element is located on a non-readable side of the fluorescent disc.

17. Device according to claim 15, wherein the light-controlling element comprises an angle mirror.

18. Device according to claim 15, wherein the light-controlling element comprises a pyramidal light-controlling element.

19. Device according to claim 17, wherein the angle mirror is made as a separate element.

20. Device according to claim 17, further comprising a device for following a displacement of the angle mirror.

21. Device according to claim 17, wherein the angle mirror consists of plurality of micro-angle mirrors.

22. Device according to claim 17, wherein the angle mirror is located directly on a surface of the fluorescent disc.

23. Device according to claim 21, wherein the plurality of said micro-angle mirrors are located on a back surface of the fluorescent disc.

24. Device according to claim 21, wherein a geometrical size of each of said micro-angle mirrors is much less than a spot size of the micro-spot.

25. Device according to claim 15, wherein the detecting means comprises one or more detectors, the source of reading radiation comprises a laser diode producing a primary linearly polarized light beam, the focusing means comprises a grating that diffracts the beam into three components, a lens, beam splitter and mirror for transmitting the information carrying radiation to the detectors; and the separating means comprises a spectrum filter or polarizer.

26. Device according to claim 25, wherein the grating diffracts the beam to produce two secondary beams in addition to the primary beam.

27. Device according to claim 15, wherein the light-controlling element is configured and positioned to reflect sufficient information-carrying radiation to approximately double that which is transmitted to the detecting means.

28. Device according to claim 27, wherein the light-controlling element is located opposite the reading side of the disc to reflect part of the information-carrying radiation to the detecting means.

29. Device according to claim 15, wherein the multilayer fluorescent disc includes a transparent protective substrate and successive data-carrying layers, located one above another, separated by polymer layers and assembled in single block, with the data-carrying layers including pits or grooves, or both, filled with fluorescent material.

30. Device according to claim 29, wherein the data-carrying layers include micro-spots comprising pits, grooves, or both, each having widths of about 0.6 µm for increased transmission of data-carrying radiation.

31. Optical data storage and reading device comprising: a multilayer fluorescent information-carrying optical disc; a source of reading radiation; means for focusing the reading radiation into a micro-spot of the multilayer disc; means for spatially separating the reading radiation from information-carrying radiation; means for detecting an availability of bit information in the micro-spot; and a compensating electronic device for compensating for an influence of dye fluorescence lifetime.

32. Device according to claim 31, wherein the compensating electronic device is located in an electric output scheme of the detector.

33. Device according to claim 31, wherein the detecting means comprises one or more detectors, the source of reading radiation comprises a laser diode producing a primary linearly polarized light beam, the focusing means comprises a grating that diffracts the beam, a lens, beam splitter and mirror for transmitting the information carrying radiation to the detectors; and the separating means comprises a spectrum filter or polarizer.

34. Device according to claim 33, wherein the grating diffracts the beam to produce two secondary beams in addition to the primary beam.

35. Device according to claim 31, wherein the multilayer fluorescent disc includes a transparent protective substrate and successive data-carrying layers, located one above another, separated by polymer layers and assembled in single block, with the data-carrying layers including pits or grooves, or both, filled with fluorescent material.

36. Device according to claim 35, wherein the data-carrying layers include micro-spots comprising pits, grooves, or both, having widths of about 0.6 µm for increased transmission of data-carrying radiation.

37. Optical data storage and reading device comprising: an information-carrying optical disc; a source of reading radiation; means for focusing the reading radiation into a micro-spot of the multilayer disc; means for spatially separating the reading radiation from information-carrying radiation; means for detecting an availability of bit information in the micro-spot; wherein the detecting means comprises a first detector for detecting the information-carrying radiation when the information-carrying radiation has a wavelength equal to a wavelength of the reading radiation and a second detector for detecting the information-carrying radiation when the information-carrying radiation has a wavelength different from the wavelength of the reading radiation.

38. Device according to claim 37, wherein the means for spatially separating comprises an optical element for directing the information-carrying radiation to one of the first detector and the second detector in accordance with the wavelength of the information-carrying radiation.

39. Device according to claim 38, wherein the optical element is a dichroic mirror.

40. Device according to claim 38, wherein the optical element is a movable filter.

41. Device according to claim 37, wherein the source of reading radiation when directed onto the disc generates information-carrying radiation having a fluorescent wavelength and information-carrying radiation having a laser wavelength, with the first detector capable of detecting the fluorescent wavelength information-carrying radiation and the second detector capable of detecting laser wavelength information-carrying radiation.

42. Device according to claim 41, which further comprises a filter element positioned between the disc and the detectors, with the filter capable of transmitting fluorescent wavelength information-carrying radiation to the detectors but not transmitting laser wavelength information-carrying radiation to the detectors.

43. Device according to claim 42, wherein the filter element is movable such that receipt of fluorescent wavelengths by the first detector identifies the disc as a fluorescent multilayer disc and enables the filter element to be maintained in position between the disc and detectors, while receipt of no fluorescent wavelengths by the first detector causes the device to move the filter element so that the laser wavelength information-carrying radiation can be transmitted to the second detector.

44. Device according to claim 43, wherein the receipt of laser wavelength by the second detector identifies the disc as a CVD or DVD.

45. Device according to claim 37, wherein the source of reading radiation comprises a laser diode producing a primary linearly polarized light beam, the focusing means comprises a grating that diffracts the beam, a lens, beam splitter and mirror for transmitting the information carrying radiation to the detectors; and the separating means comprises a spectrum filter or polarizer.

46. Device according to claim 45, wherein the grating diffracts the beam to produce two secondary beams in addition to the primary beam.

47. Device according to claim 37, wherein the disc is a multilayer fluorescent disc that includes a transparent protective substrate and successive data-carrying layers, located one above another, separated by polymer layers and assembled in single block, with the data-carrying layers including pits or grooves, or both, filled with fluorescent material.

48. Device according to claim 47, wherein the data-carrying layers include micro-spots comprising pits, grooves, or both, each having widths of about 0.6 µm for increased transmission of data-carrying radiation.

* * * * *